(12) United States Patent
Kullman et al.

(10) Patent No.: US 7,072,666 B1
(45) Date of Patent: Jul. 4, 2006

(54) METHOD AND SYSTEM FOR COMMUNICATING LOCATION IN A CELLULAR WIRELESS SYSTEM

(75) Inventors: John Kullman, Olathe, KS (US); Jared A. Bohndorf, Olathe, KS (US); Rick Haught, Lawrence, KS (US)

(73) Assignee: Spring Spectrum L.P., Overland Park, KS (US)

( * ) Notice: Subject to any disclaimer, the term of this patent is extended or adjusted under 35 U.S.C. 154(b) by 437 days.

(21) Appl. No.: 09/886,637

(22) Filed: Jun. 21, 2001

(51) Int. Cl.
*H04Q 7/20* (2006.01)

(52) U.S. Cl. ............................. 455/456.1; 455/404.2; 455/456.3

(58) Field of Classification Search ............. 455/456.1, 455/456.3, 457; 342/450
See application file for complete search history.

(56) References Cited

U.S. PATENT DOCUMENTS

| | | | |
|---|---|---|---|
| 5,508,707 A * | 4/1996 | LeBlanc et al. | 342/457 |
| 5,764,188 A * | 6/1998 | Ghosh et al. | 342/457 |
| 5,873,040 A | 2/1999 | Dunn et al. | |
| 6,466,796 B1 * | 10/2002 | Jacobson et al. | 455/456.3 |
| 2002/0151313 A1 * | 10/2002 | Stead | 455/456 |
| 2002/0193121 A1 * | 12/2002 | Nowak et al. | 455/456 |

OTHER PUBLICATIONS

Scot Drysdale, "Voronoi Diagrams: App[lications from Archaology to Zoology," Regional Geometry Institute, Smith College, Jul. 19, 1993.

* cited by examiner

*Primary Examiner*—Charles N. Appiah
*Assistant Examiner*—Bryan Fox

(57) ABSTRACT

A method and system for communicating location information in a cellular wireless system. Each sector in a coverage area is characterized by a polygon of influence with respect to the other sectors. The polygon of influence is then used as a basis to characterize the scope or position of the sector and, particularly, the location of a mobile station that is operating in the sector. A location-based-service provider can then use that polygon of influence based location information to facilitate providing a location-based service.

33 Claims, 8 Drawing Sheets

METHOD AND SYSTEM FOR COMMUNICATING LOCATION IN A CELLULAR WIRELESS SYSTEM

BACKGROUND

1. Field of the Invention

The present invention relates to mobile communications and, more particularly, to methods and systems for communicating location in a cellular wireless communication system.

2. Description of Related Art

Cellular wireless is an increasingly popular means of personal communication in the modern world. In a cellular wireless network, a coverage area is divided into a number of sectors defined by radiation patterns from base stations. A mobile station, such as a cellular telephone, personal digital assistant ("PDA"), cellular modem, or other such device, may then communicate with the base station via a radio frequency air interface. In turn, each base station is typically coupled with other access equipment, such as a gateway or switch, to provide connectivity with a transport network such as the public switched telephone network ("PSTN") or the Internet. A person using a mobile station can thereby communicate over the transport network from virtually any place inside the cellular coverage area.

An important feature of contemporary cellular wireless networks is an ability to locate the geographical position of a mobile station. Such a feature was initially developed to assist emergency services in locating a mobile station. For example, in the United States, the Federal Communications Commission ("FCC") has mandated the implementation of "Enhanced 911" ("E911") services, which includes a requirement for cellular wireless carriers to report mobile station location to a public safety access point ("PSAP") when connecting a call from a mobile station to the PSAP.

The E911 mandate was divided into two phases. According to Phase 1, a cellular wireless carrier must identify the location of a mobile 911 caller with an accuracy of the sector in which the caller is located. According to Phase 2 (as now incorporated in Industry Standard TLA/ELA/IS-J-STD-036 (J-STD-036), entitled "Enhanced Wireless 9-1-1, Phase 2"), a cellular carrier must identify the location of a mobile 911 caller with an accuracy of at least 50 or 100 meters, depending on the mechanism used to determine location.

In order to comply with Phase 2, a wireless carrier can use network-based positioning mechanisms (such as triangularization techniques, etc.) or handset-based positioning mechanisms (such as GPS), or a combination of both. Unfortunately, however, many carriers are not yet equipped with the necessary positioning technology, and it will be some time before all or even most mobile stations are equipped with GPS positioning technology or before cellular carriers will be able to locate all mobile stations with the necessary degree of granularity.

Consequently, many carriers have focused principally on compliance with Phase 1 of the mandate.

Most carriers can readily comply with Phase 1, because a carrier usually maintains in a home location register ("HLR") or other profile store an indication of the sector in which each active mobile station is operating. Thus, when a carrier receives a 911 call from a mobile station, the carrier can refer to the profile store in order to identify the sector where the mobile station is operating. The carrier can then set up the call to a 911 service center (as PSAP) and provide the center with an indication of that sector. Typically, the carrier will give the PSAP an indication of (i) the geographic position or street address of the base station tower and (ii) the azimuth (angle) at which the sector extends from the base station tower. Emergency service personnel can then work to locate the caller in that general direction from the base station tower.

Emergency services are thus one sort of "location-based service," as they can use a location as a basis to provide a service. In particular, knowing the geographic location of the sector from which a mobile emergency call originates, the emergency service can seek to locate and assist the caller.

The availability of location information to support E911 services has given rise to the development of many other location-based services as well. For instance, given the location of a mobile station, a location-based service provider (e.g., a wireless cellular carrier or third party) can provide the mobile station user with a weather or traffic report in the user's vicinity. As another example, a location-based service provider can report a list of services or establishments (e.g., restaurants, parks, theatres, etc.) in the user's vicinity. As still another example, a location-based service provider can provide a mobile station user with a map of the user's location or with directions for travel between the user's location and another location. And as yet another example, knowing that a mobile station is operating in a particular location, a location-based service provider can send the mobile station a location-based message, such as an advertisement or coupon for a nearby establishment. Other location-based services exist currently or will be developed in the future as well.

Just as a cellular wireless carrier can provide a PSAP with an indication of where a mobile station is located, the carrier can provide other location-based service providers with an indication of where a mobile station is located. For instance, when connecting a call from a mobile station to a location-based service platform (or otherwise being involved with a communication session with a location-based service), the carrier can transmit to the service platform an indication of the sector in which the mobile station is currently operating. As with E911 service, the carrier might provide the geographic coordinates or street address of the sector's base station tower together with an azimuth of the sector. Alternatively, the carrier might translate the base station location into a postal zip code and report that postal zip code to the location-based service provider. The location-based service provider may then perform a service based on that location information.

When sector information has been used as a basis to describe the location of a mobile station, the description has been inherently vague, because it is not immediately clear where in the sector the mobile station is actually located. For emergency services, this presents a problem, as emergency service personnel may have trouble locating a mobile caller within a given sector. Similarly, some other location-based services may depend on knowing more precisely where a given mobile station is located, so the commercial value of those services may diminish due to the imprecision of the location information.

Therefore, a need exists for an improved method of communicating location in a cellular wireless system, so as to facilitate location-based services.

SUMMARY

The present invention relates to a method and system for communicating location information in a cellular wireless system. According to an exemplary embodiment of the invention, when a mobile station is operating in a given sector, the mobile station's location can be characterized by reference to a "polygon of influence" drawn for the sector, i.e., by reference to a polygon in which substantially all points are closer to the origin of the sector than to the origins of adjacent sectors. When prompted to report the location of a mobile station, a cellular carrier may thus report an indication of the polygon of influence, such as the geographic coordinates of a point within the polygon of influence.

Thus, in one respect, an exemplary embodiment of the invention can take the form of a method of communicating a geographic location of a given sector in a cellular wireless system, so as to facilitate a location-based service with respect to the given sector. The method can involve establishing a PI-based location to represent the given sector and communicating the PI-based location as a representation of the geographic location of the given sector. A location-based service (such as locating a mobile station in the sector, providing an emergency service, weather reporting, traffic reporting or route planning, for instance) can then be performed based on the PI-based location.

In another respect, an exemplary embodiment of the invention can take the form of a method of communicating mobile station location in a cellular wireless system, where the cellular wireless system has multiple of sectors. The method can involve the functions of (i) determining that a mobile station is located in a given sector, (ii) establishing a PI-based location to represent the given sector, and (iii) communicating the PI-based location as a representation of where the mobile station is located.

The function of establishing the PI-based location for the sector could take various forms. For example, it could be simply querying a table or other data source that correlates an already-created PI-based location with the sector. As another example, it could extend to creating the PI-based location for the sector, including establishing a polygon of influence for the sector.

The function of communicating the PI-based location can also take various forms. For example, it can involve storing the PI-based location in a data store that is accessible (e.g., through suitable messaging) to a recipient entity such as a mobile positioning center and/or a location-based-service provider for instance. As another example, it can involve transmitting the PI-based location to a location-based service provider in response to a request for a location of the mobile station.

In still another respect, an exemplary embodiment of the invention can take the form of a method that involves the functions of (i) determining that a mobile station is located in a given sector of a cellular wireless system, (ii) selecting a PI-based location to represent the given sector and (iii) performing a service based on the PI-based location.

In yet another respect, an exemplary embodiment of the invention can take the form of a system for communicating mobile station location in a cellular wireless system having a number of sectors, where the mobile station is operating in one of the sectors. The system can include a processor, a data storage medium, and a set of machine language instructions stored in the data storage medium and executable by the processor to establish a PI-based location respectively for each sector. Further, the system can be programmed to communicate that PI-based location to a recipient entity, so as to facilitate a location-based service.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF EXEMPLARY EMBODIMENT

1. Characterizing Sectors

Figure 1:
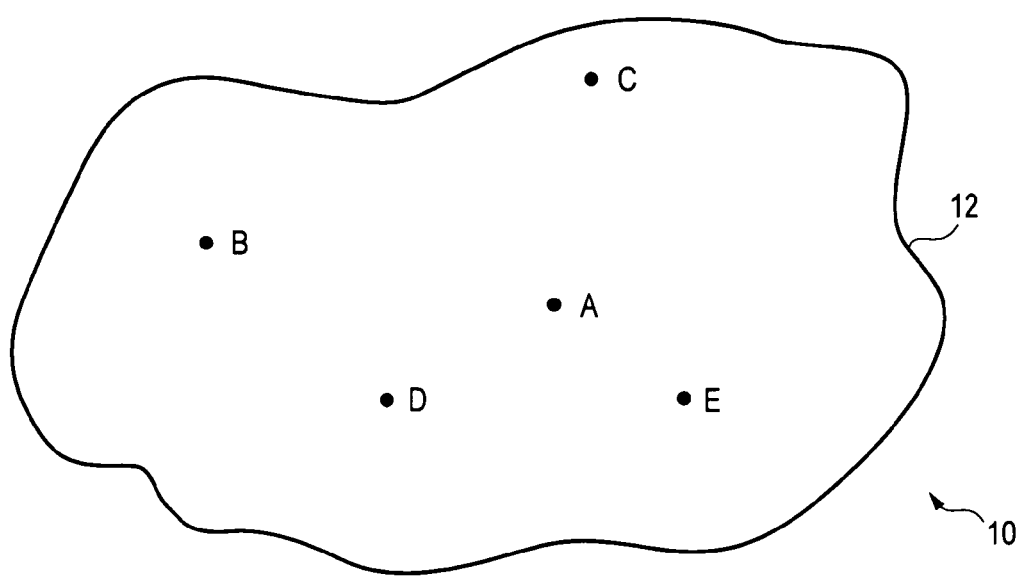
FIGS. 1 and 3–11 illustrate a process of creating PI-based locations for the sectors in an exemplary coverage area.

In accordance with an exemplary embodiment of the present invention, a cellular wireless carrier or other entity will establish a respective "polygon-of-influence based location" ("PI-based location") to represent each of one or more sectors in a given cellular coverage area. Generally speaking, a PI-based location for a given sector can be defined as a location that is based on a polygon of influence for that sector taken with respect to one or more other sectors.

A polygon of influence for a sector taken with respect to other sectors is a polygon in which substantially all points are closer to the origin of the sector than to the origins of the other sectors. As such, a PI-based location for a given sector can be a geographic characterization of the polygon of influence itself (such as the geographic coordinates of the nodes of the polygon), or of an area drawn with respect to the polygon of influence.

Alternatively, the PI-based location can be geographic coordinates of one or more points within the polygon, such as substantial midpoint of the polygon or of a minimum bounding rectangle drawn around the polygon. Still alternatively, the PI-based location can take other forms, based in some way on a polygon of influence. For instance, a PI-based location can be a street address or intersection that lies at or near the center of a polygon of influence. Other examples are possible as well.

Numerous techniques and tools may be applied in order to establish polygons of influence for the sectors in a coverage area. The process may be executed manually, such as by plotting the locations of base stations and drawing lines to form the polygons. Alternatively, the process may be automated, such as by programming a computer with instructions to read data points representing the locations of base stations, to "draw" the polygons in memory, and to output (e.g., print and/or display) indications of the polygons. Still alternatively, the process may be a combination of manual and automated techniques.

In accordance with the exemplary embodiment, the process will be largely computer-executed. The input to the process can be a data table that lists as records the location coordinates (e.g., latitude/longitude) and azimuth (e.g., angle of propagation from true north) of each sector in the coverage area. Since most base stations will include three 120° antennas (to achieve approximately 360° coverage), the input data table will likely (although not necessarily) list the same base station coordinates for each sector of a given base station, although each of the three sectors will likely have a different azimuth.

The output of the process, in turn, may be a revised data table that reflects representative coordinates of each sector in the coverage area, established according to the exemplary embodiment. This output table may then be used as a basis to characterize the location of a mobile station that is operating in a given sector. Namely, the mobile station may be said to be operating at or near the representative coordinates of the sector. Another output of the process may be a number of objects (object models in computer memory) that define polygons of influence derived for the sectors in the coverage area. A carrier can then conveniently use these objects to display and/or report the polygons of influence.

Referring to FIG. 1, a schematic illustration of a cellular coverage area 10 is provided, to help explain how the exemplary embodiment will operate in practice. For simplicity, coverage area 10 is shown to include five representative base station towers, designated A, B, C, D and E. In reality, the coverage may have more or fewer base station towers. Further, the coverage area is shown to include an outer boundary 12.

Figure 2:
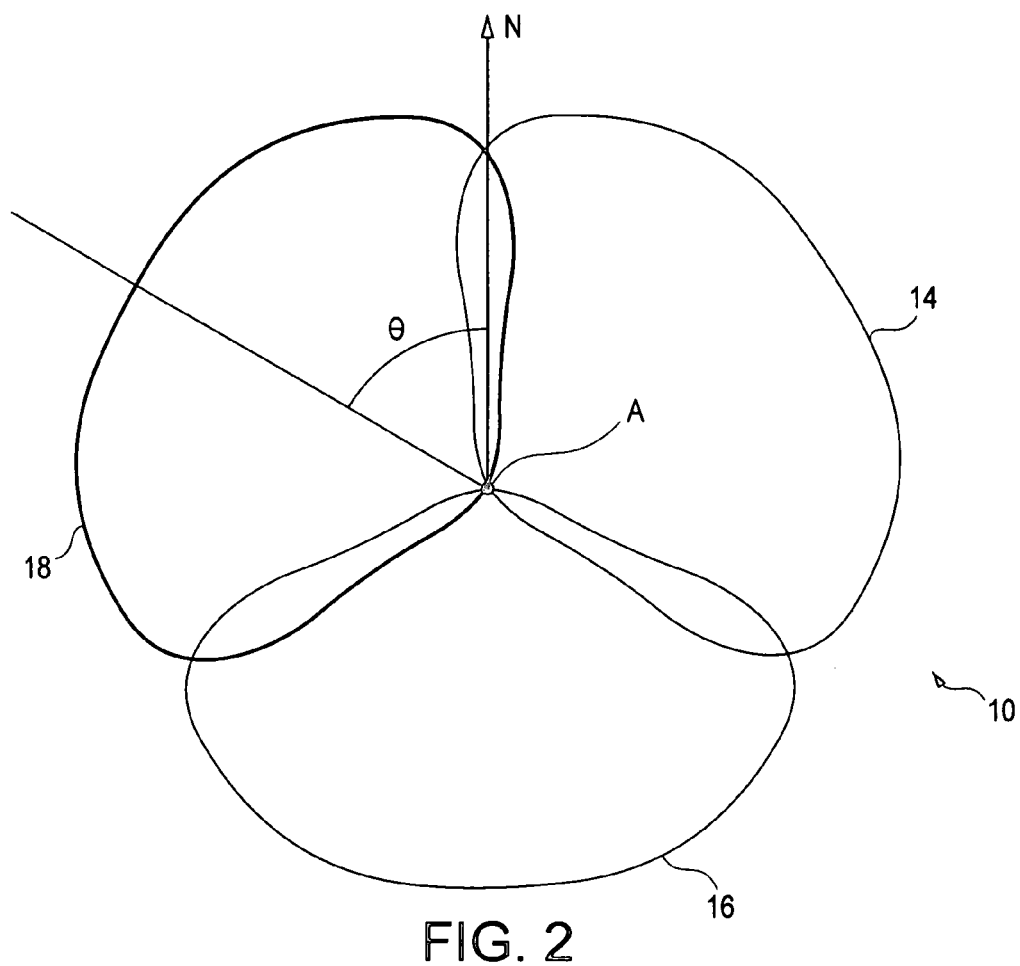
FIG. 2 illustrates exemplary radiation patterns from a base station.

Further for simplicity, it will be assumed that each base station tower employs three antennas (or antenna arrangements) to produce three evenly spaced 120° radiation patterns representing respective 120° sectors. FIG. 2 schematically depicts (in an idealized form) such radiation patterns 14, 16, 18 (i.e., sectors 14, 16, 18) extending from exemplary base station tower A of FIG. 1. Each antenna, and therefore each respective radiation pattern, has a respective azimuth, which is its angle of propagation from true north or from some other reference direction. FIG. 2 shows an azimuth θ for sector 18 by way of example. It should be understood that other radiation patterns are possible as well.

According to an exemplary embodiment, the process of deriving polygons of influence for the sectors in a coverage area involves first distinguishing the point of origin (or "origin point") of each sector for a given base station, and then drawing a polygon of influence for each sector. The reason to distinguish the point of origin of each sector is to enable a polygon of influence algorithm to readily divide apart the sectors of a given base station, as will become more apparent from the following discussion.

To distinguish the point of origin of each sector for a given base station, a computer can be programmed to plot for each sector a point that extends radially for about 3 feet (or some other relatively small distance, the same for each sector) from the base station, along the azimuth of the sector. Assuming that the input data table lists the same base station coordinates for each of its sectors, this distinguishing-process can thus involve looking at each record in the input table and shifting the sector coordinates by 3 feet along the azimuth indicated in the record. This will usually be a reasonable approximation in any event, since the three antennas on a base station tower usually extend out several feet along their azimuths from the tower.

One way to do this is to apply a computer program written to use the spatial capabilities of a software product such as MapInfo (available from MapInfo Corporation of Troy, N.Y.). The program can be instructed to read a data point (latitude/longitude coordinates) and azimuth from each record of a table. For each record, the program can then be instructed to (i) draw a circle of 3 foot radius around the data point, (ii) draw a line of greater than 3 foot length extending at the azimuth, and then (iii) find the point of intersection between the circle and line. The program can then be instructed to output that point as the distinguishing point of origin of the sector.

Figure 3:
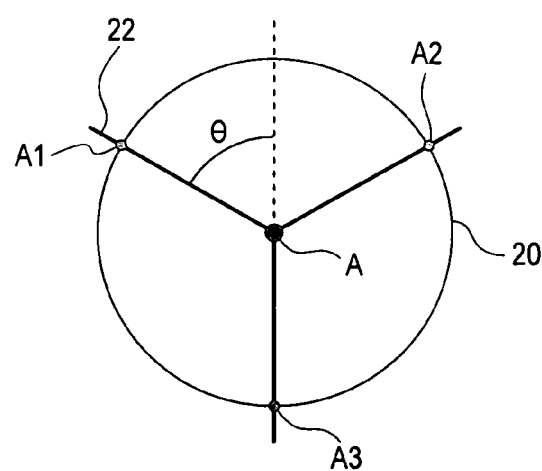

FIG. 3 illustrates this process for the sectors of base station A for instance. In the exemplary embodiment, the input data table would list the geographic coordinates of base station tower A as being the location of this sector. A circle 20 of radius 3-feet can then be drawn (i.e., its equation established) around that location. For sector 18, a line 22 can then be drawn extending from the location out at the azimuth 0 of the sector. Circle 20 and line 22 will then intersect at a point A1, the geographic coordinates of which can be used as the point of origin of the sector. This same process can be repeated for each sector in a coverage area, thereby producing three points around each base station tower, representing the points of origin of the three sectors established by the base station.

Figure 4:
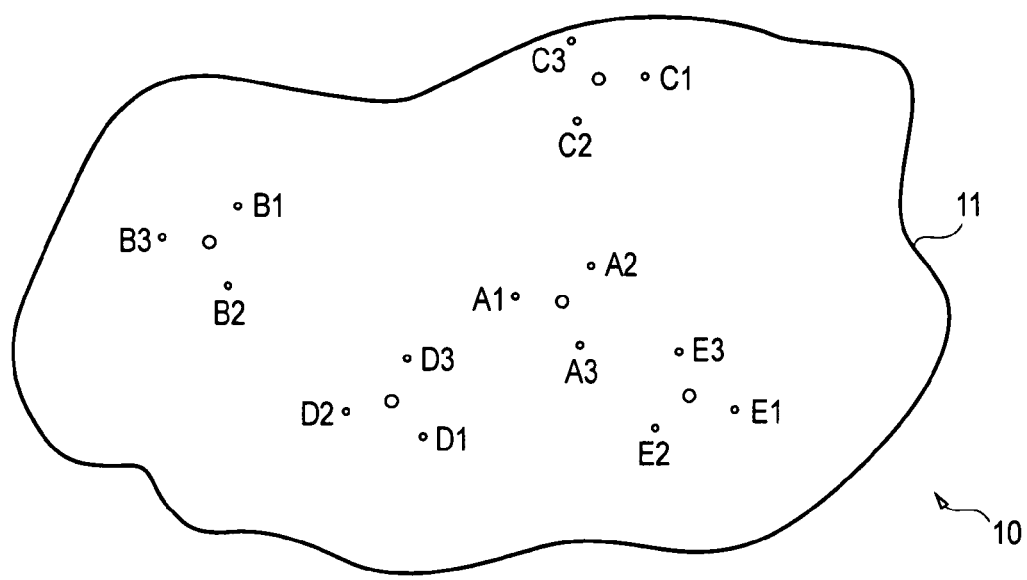

Turning now to FIG. 4, coverage area 10 is shown with the resulting points of origin indicated for each of the three sectors of each base station A–E. The points of origin of the sectors established by base station A are shown as A1, A2 and A3, the points of origin of the sectors established by base station B are shown as B1, B2 and B3, and so forth.

Provided with a point of origin of each sector in the coverage area, the points can be input into a computer program that is executable to establish a polygon of influence for each point with respect to the other points in the coverage area (a "PI program.") Before applying the PI program, however, it would be best to first simplify the boundaries of the coverage area. In particular, according to the exemplary embodiment, a minimum bounding rectangle ("MBR") can be established around the outer boundary 11 of the coverage area. Assuming that outer boundary is modeled as a bounding polygon defined by a number of nodes having x, y coordinates, the MBR can extend from the minimum x, y coordinates of the bounding polygon to the maximum x, y coordinates of the bounding polygon. (After applying the PI program, the bounding polygon can then be used to clip any polygons of interest that extend beyond it.)

Figure 5:
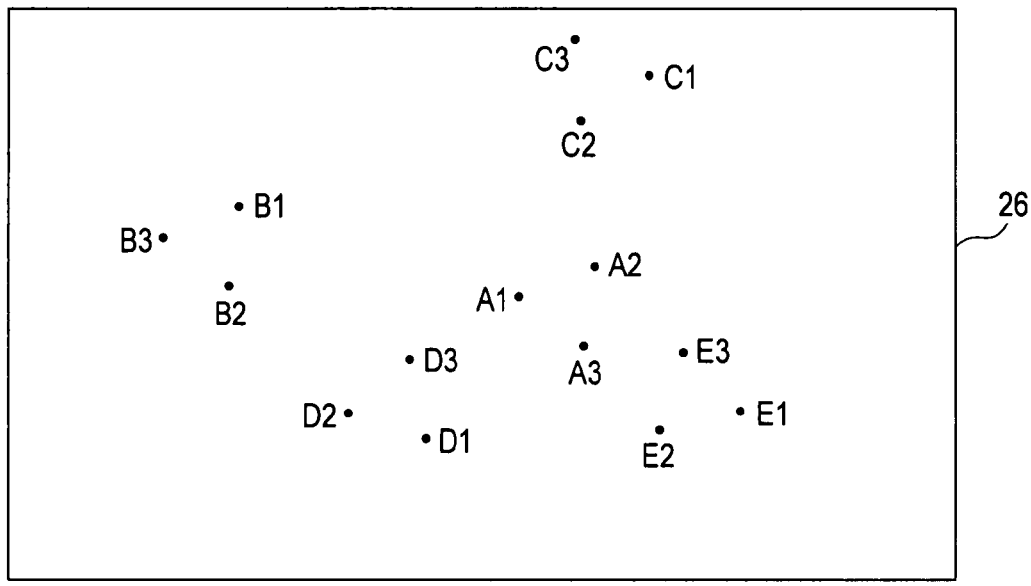

FIG. 5 illustrates such an MBR 26 drawn around coverage area 10 of FIG. 1. In this figure, the outer boundary 11 of coverage area 10 has been then omitted for clarity. Further, the original base station locations have been omitted for clarity as well. The end result is an MBR encompassing the points of origin of each sector in coverage area 10.

Provided with the MBR encompassing a set of points of origin, the PI program will then proceed to derive a polygon of influence for each point. To do so, an exemplary PI program will be written to execute the following process for each point in the set (i.e., for each sector as to which the program is instructed to establish a polygon of influence):

(1) Make a list of all connecting-lines that connect the point to each of the other points in the set.
(2) Make a list of lines to use as potential PI edges, including:
   (a) Perpendicular bisectors of each connecting-line; and
   (b) The edges of the MBR.
(3) Clip all of the potential PI edge lines where they intersect each other. For each potential PI edge line, retain as a PI edge the piece of the PI edge line that is closest to the point. The process of clipping is completed once the potential PI edge lines do not intersect any previously clipped line segment in the clipped PI edge list.
(4) Connect all of the PI edges, so as to form a polygon that completely encloses the point.

FIGS. 6–11 illustrate this process in detail for exemplary point A1 in FIG. 5, so as to establish a polygon of influence for the corresponding sector 18 of base station A.

Figure 6:
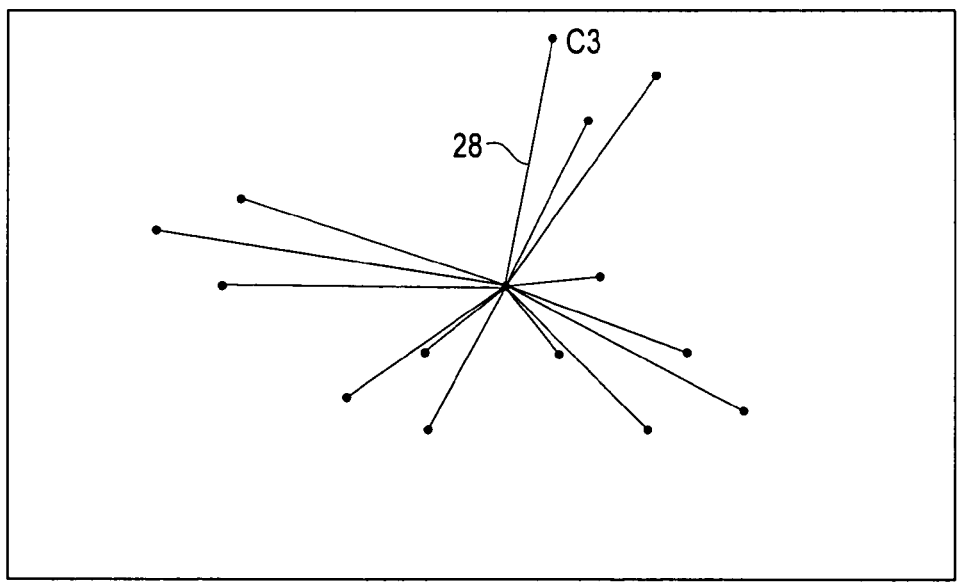

As noted, the exemplary PI program first makes a list of all connecting-lines that connect points to each other in the set. FIG. 6 illustrates these connecting-lines for point A1.

Each line radiates from point A1 to another point in the set. For example, a connecting-line 28 extends from point A1 to point C3.

Figure 7:
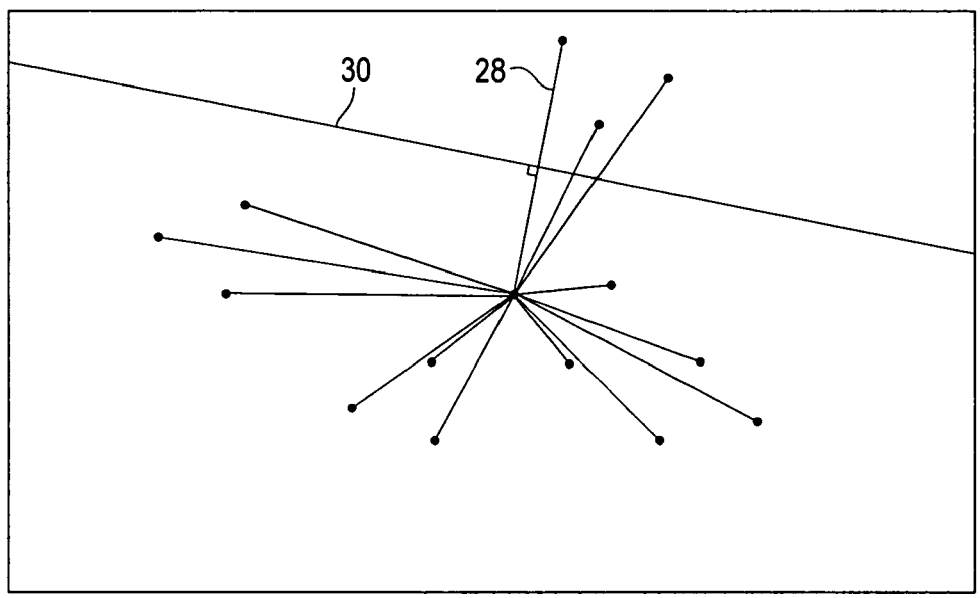
Figure 8:
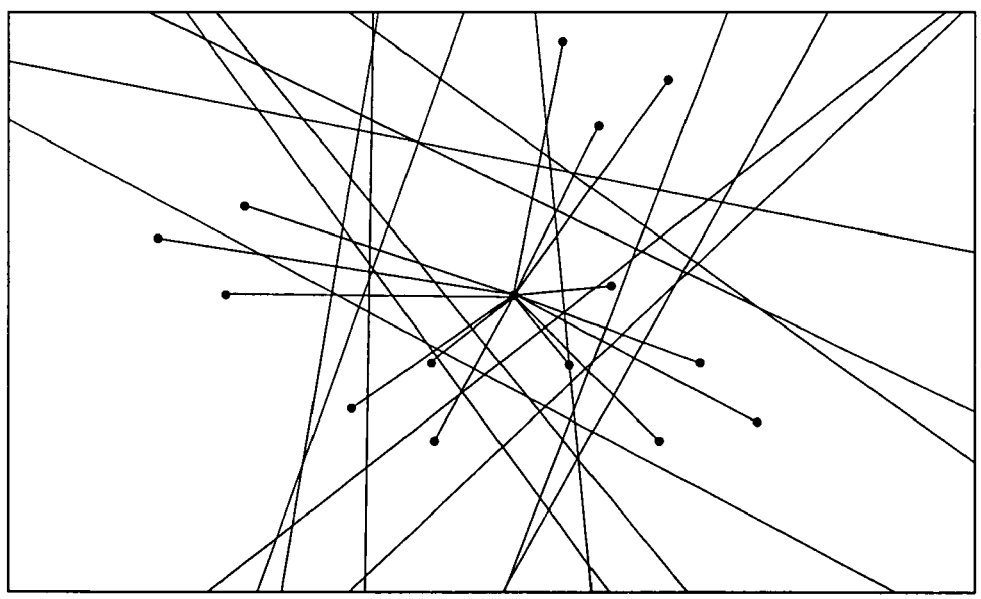

Next, the PI program makes a list of potential PI edge lines, including (a) perpendicular bisectors of each connecting-line and (b) the edges of the MBR. FIG. 7 depicts an exemplary perpendicular bisector 30 of line 28. In turn, FIG. 8 depicts perpendicular bisectors of all of the connecting-lines within the MBR.

Figure 9:
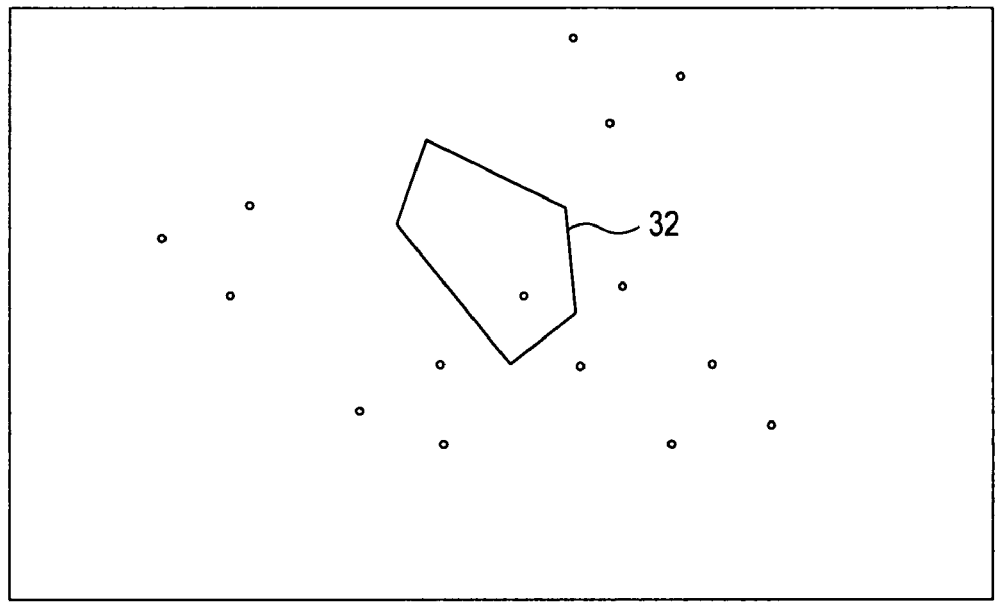
Figure 10:
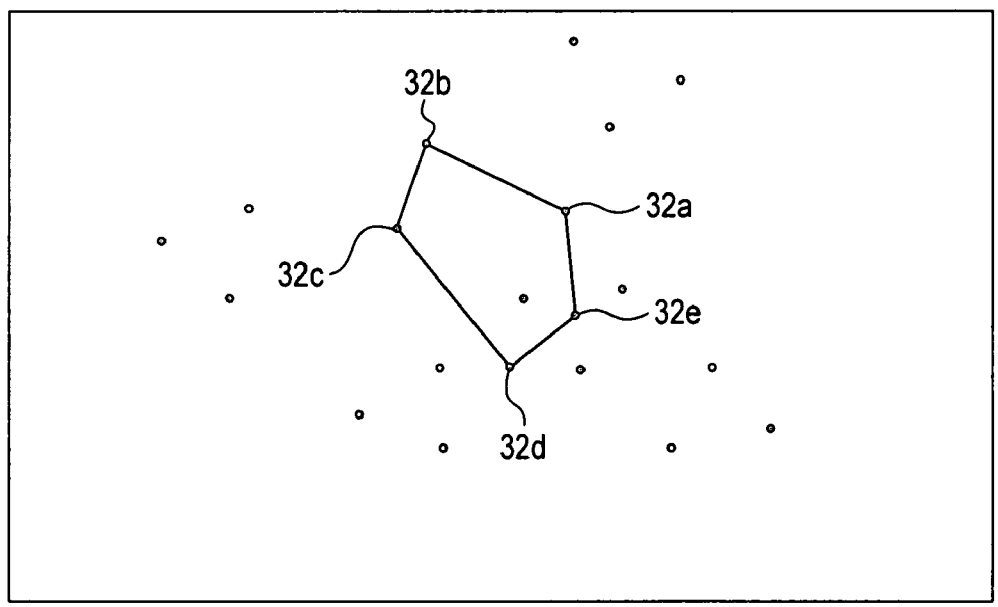

In turn, the PI program clips all of the potential PI edge lines where they intersect each other. As shown in FIGS. 9 and 10, the result of this clipping for point A1 is a polygon of influence 32, which the PI program can represent by the coordinates of nodes 32a, 32b, 32c, 32d and 32e. In the exemplary embodiment, substantially every point within this polygon of influence will be closer to point A1 than to other points within the MBR.

Note that when the PI program performs step (2)(a) of this process, it will inherently include as potential PI edge lines the lines that divide the sectors of a given base station. The reason for this is that a perpendicular bisector of a line that connects two sector points of origin derived with the process above will itself extend radially from the base station, directly between the azimuths of the two sectors. This should generally be the case regardless of whether the sectors all provide 120° coverage.

As output for each sector, the PI program can provide a list of the nodes of the polygon derived for the sector. These nodes can then be provided as input to the MapInfo program, so as to allow the MapInfo program to represent each polygon as an object, which can be displayed or manipulated as desired.

As noted above, the original bounding polygon can be used to clip the polygons produced by the PI program. To do this, the nodes of the original bounding polygon can be input to the MapInfo program, so that the MapInfo program can represent the bounding polygon as an object. Provided with an object representing each polygon of influence and an object representing the original bounding polygon, the MapInfo program can readily clip each polygon of influence to the extent it extends beyond the bounding polygon. The MapInfo program can then output a revised set of nodes for the polygons of influence.

The process described so far for establishing polygons of influence for the sectors in a coverage area is intended to be an example only. Variations are possible. For instance, one variation may be to omit the function of distinguishing the points of origin of each sector for a given base station. Instead, the PI program can receive as input the coordinates of each base station (which is typically, in effect, the point of origin for all sectors of the base station) and can generate as output a polygon of influence around each base station. In turn, for each base station that defines N sectors of specified azimuths, the PI program or another program can divide each polygon of influence into N parts. For instance, a program can draw lines extending radially from the base station directly in between each azimuth, and the program can clip the lines at the point that they intersect the polygon of influence. The point of intersection can then function as a common node of each adjacent sector of the base station. Other variations are possible as well.

As noted above, the polygon of influence derived for a given sector may then be used as a basis to characterize the location (e.g., the geographic scope or position) of the sector and thereby as a basis to characterize the location a mobile station known to be operating in the sector. This should function as good characterization, because every point in the polygon of influence for a sector is likely (if not certain) to be closer to the base station that defines the sector than to any other base station in the coverage area. Phrased another way, when a mobile station is operating in a given sector, the mobile station is likely to be located in the polygon of influence for the sector. (Note that, depending on various factors (e.g., signal strength, topography, etc.), this assumption may sometimes fail; but it is believed that the assumption will be valid in most cases. Nevertheless, the present invention functions to estimate location, which may be more or less accurate from case to case.)

In the exemplary embodiment, the PI program can conveniently be written to record in the output data table a PI-based location respectively for each sector in a coverage area. The PI-based location for a given sector can take various forms. As an example, the PI-based location can be a list of the geographic coordinates of the nodes that define the polygon of influence for the sector. Conveniently, a recipient of such an indication could model the polygon of influence (using the MapInfo program, for instance) and perhaps display the polygon on a map, so as to clearly understand where the polygon of influence lies and thus where the mobile station is likely positioned. This form of indication would be particularly useful for emergency services, since it would allow emergency service personnel to quickly visualize the area where a mobile 911 caller is likely to be located.

As another example, the PI-based location for each sector can instead take the form of a representative point selected from within the polygon of influence. One such representative point could be the centroid, or center of mass, of the polygon. Typical polygons of influence that will result from the process described above, however, will be complex, having five or more sides, and it is computationally difficult to determine the center of mass of a complex polygon. Therefore, instead of using the center of mass as the representative point, a more simple representative point can be used.

One example of a more simple representative point is the midpoint of a minimum bounding rectangle around the polygon of influence, i.e., the midpoint of a rectangle extending from the minimum x and y coordinates of the polygon of influence to the maximum x and y coordinates of the polygon of influence. In the exemplary embodiment, the PI program can conveniently be written to find the mid-point of such a rectangle by finding the intersection between the diagonals of the rectangle.

Figure 11:
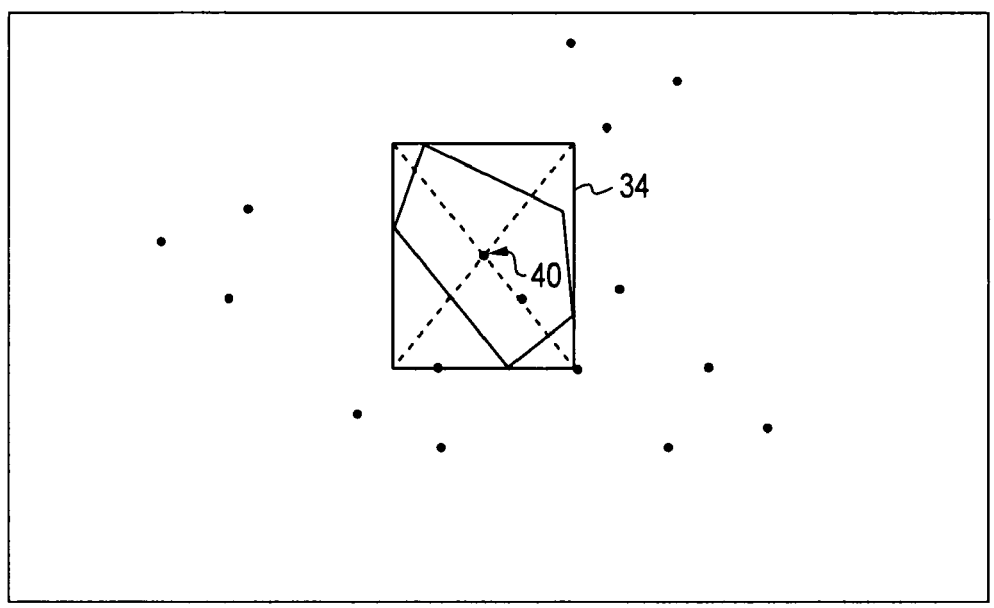

Referring to FIG. 11, for example, a minimum bounding rectangle 34 has been drawn around polygon of influence 32, and diagonal lines 36, 38 have been drawn through rectangle 34. Those diagonal lines intersect at a point 40. With this exemplary process, the geographic coordinates of point 40 can be used as the PI-based location representing sector 18 of base station A. Other examples are possible as well.

There are advantages to using a single geographic point as the PI-based location to characterize the sector in which the mobile station is operating. For one, it is easy to store the location coordinates of the representative point. Provided with an input data table described above, the output data table can take the same form, but the location coordinates listed for each sector can be the newly derived representative point of the polygon of influence for the sector. Further, many existing location-based services are designed to receive a single location point (e.g., latitude/longitude coordinates) indicative of the mobile station's location. The representative point selected from within a polygon derived according the process described above can thus readily accommodate those services.

In accordance with the exemplary embodiment, a cellular carrier or other entity can perform the process described above periodically or in response to various other triggering events, so as to regularly update or maintain the PI-based location of each sector in the carrier's coverage area. For example, a carrier can execute the programs described above once a day. As another example, whenever a substantial change occurs in a carrier's coverage area (such as when a new base station is added, or when new buildings are erected), the carrier can execute the process described above.

2. Communicating PI-based Location

A PI-based location can be used as a representation of the geographic location of a sector and/or as a representation of the geographic location of a mobile station operating in a sector. The PI-based location can therefore be used to facilitate a location based service with respect to a given sector, such as a location-based service with respect to a mobile station operating in the sector.

PI-based location information can be used in a variety of ways. For example, a carrier or other entity can push (e.g., send) a PI-based location to location-based-service provider. As another example, the carrier or other entity can make PI-based location information available to be pulled (e.g., read) by a location-based-service provider. As still another example, the carrier or other entity can itself use the PI-based location information to carry out a location-based service.

a. Exemplary Network Architecture

Figure 12:
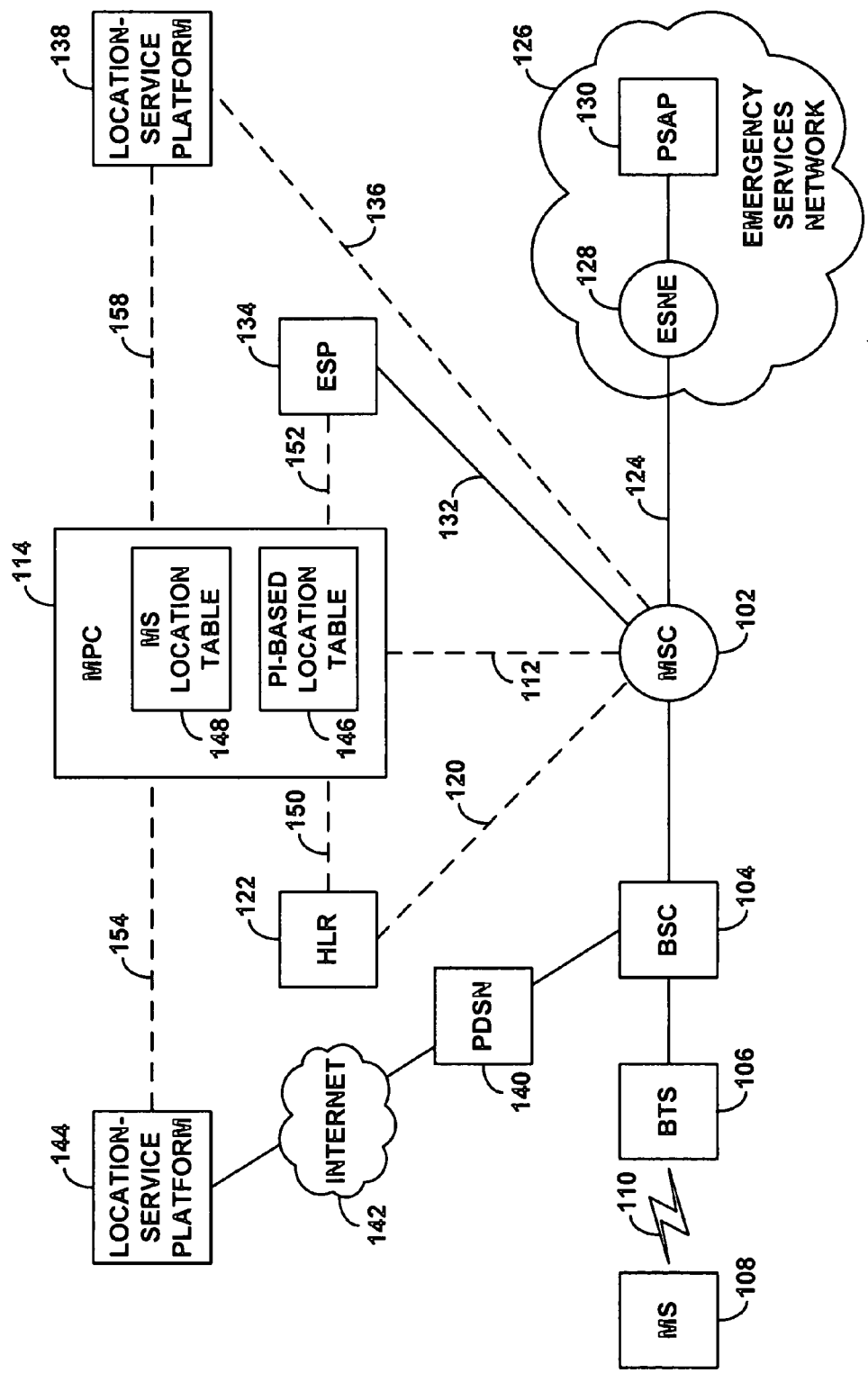
FIG. 12 is a simplified block diagram illustrating a network arrangement suitable for carrying out the exemplary embodiment.

Referring now to FIG. 12, there is shown a simplified block diagram of a communication system 100 in which the exemplary embodiment can be employed. It should be understood that this and other arrangements and processes described herein are set forth for purposes of example only, and other arrangements and elements (e.g., machines, interfaces, functions, orders of elements, etc.) can be used instead and some elements may be omitted altogether. Further, as in most telecommunications applications, those skilled in the art will appreciate that many of the elements described herein are functional entities that may be implemented as hardware, firmware and/or software, and as discrete components or in conjunction with other components, in any suitable combination and location.

By way of example, system 100 is shown to include a mobile switching center ("MSC") 102 coupled with a base station controller ("BSC") 104, which is coupled in turn with a base transceiver station ("BTS") 106. The BTS includes one or more antenna elements arranged to produce radiation patterns defining one or more sectors. An exemplary mobile station ("MS") 108 then operates within a given sector and communicates via an air interface 110 with BTS 106, and in turn via the BSC 104 with MSC 102.

As further illustrated by way of example, MSC 102 is coupled by a signaling link 112 to a mobile positioning center ("MPC") 114. As defined by J-STD-036, the MPC functions to retrieve, forward, store and control position data. As such, the MPC can be based on a location information platform, such as the "local.info" service platform available from SignalSoft Corp. of Boulder, Colo. Further, both MPC 114 and MSC 102 are preferably programmed with an industry standard message set such as that defined by TIA/EIA/IS-41D ("IS-41") and J-STD-036, so as to facilitate communication over link 112 between MPC 114 and MSC 102.

An example of one of the messages that MSC 102 can send to MPC 114 in the exemplary embodiment is an "Origination Request INVOKE" or "ORREQ" message, which generally functions to request call processing assistance on behalf of a registered MS. An ORREQ message can carry a number of parameters, one of which is an identification of the MS (such as a mobile identification number ("MIN")) and another of which is a "LocationAreaID" parameter that indicates the BTS currently serving a mobile station and the sector in which the mobile station is operating. The MPC can then apply service logic send an "Origination Request Return Result" or "orreq" message back to the MSC, indicating a service treatment such as where to route the call.

MPC 114 can be implemented as one or more computer applications and database functions programmed on an SCP such as the Integrated Service Control Point ("ISCP") made by Telcordia Technologies, Inc. Further, another SCP may be positioned along signaling link 112, so that MSC 102 communicates with the other SCP, and the other SCP in turn communicates with MPC 114.

Conventionally, MSC 102 is further coupled via a signaling link 120 with an HLR 122, which stores service qualifications and other information concerning mobile stations. In normal operation, when a mobile station such as MS 108 enters into a new sector, MSC 102 sends a registration notification ("REGNOT") message via link 120 to HLR 122. According to IS-41, of the parameters in the REGNOT message is the LocationAreaID, which the HLR stores in a profile to facilitate terminating calls to the mobile station.

In exemplary system 100, MSC 102 is further coupled by a trunk 124 with an emergency services network 126, which includes an Emergency Services Network Entity ("ESNE") 128 and a PSAP 130. ESNE 128 functions effectively as a local exchange carrier ("LEC") switch (such as an SSP) for receiving call traffic into the emergency services network and for routing that call traffic to one or more PSAPs such as PSAP 130. Each PSAP, in turn, may be a 911 center or other point that receives emergency services calls. Thus, ESNE 128 can engage in call-setup signaling with MSC 102 so as to set up calls to PSAP 130.

Additionally, MSC 102 is shown coupled by a trunk 132 with an enhanced services platform ("ESP") 134. ESP 132 can be a programmed computer or more complex platform, such a platform programmed on a service node from INFONXX, Inc. of Bethlehem, Pa., or InterVoice-Brite Systems, Inc. of Dallas, Tex. As such, ESP 132 can include an integrated voice response unit ("IVRU") for interacting with a caller, and it can include suitable interfaces and logic for communicating with MSC 102.

Still further, MSC 102 is shown coupled by a link 136 with a location-based-service provider platform 138. Link 136 could take various forms. As an example, the link could be an Internet connection. As another example, the link could be a short message service ("SMS") path including a short message service center ("SMSC," not shown) and perhaps a bulk message gateway ("BMG," not shown) for communicating short text messages.

Yet further, BSC 104 is shown coupled to a packet data serving node ("PDSN") 140, which provides connectivity to the Internet 142. Another location-based-service provider platform 144 is then shown linked with the Internet 142 as well.

b. Maintenance of Location Information

In accordance with the exemplary embodiment, MPC 114 can be arranged to periodically generate and maintain data indicating a PI-based location for each sector in a carrier's coverage area. Since MPC 54 is typically a program application executed on an SCP, the process of providing this added functionality should be a straightforward revision of the MPC program and/or addition of other program modules as desired.

In particular, the MPC can be provided with an input table that lists for each sector in the coverage area (i) the LocationAreaID of the sector, (ii) the geographic coordinates of sector, namely of the BTS, and (iii) the azimuth of the sector. Applying the process described above, the MPC can then produce an output table 146 that indicates for each sector (i) the LocationAreaID of the sector and (ii) a PI-based location of the sector, and the MPC can store the output table in memory or elsewhere (internally and/or externally). The output table can be referred to as a "PI-based-location table."

In the exemplary embodiment, when the MPC receives an ORREQ that carries a LocationAreaID parameter, the MPC can then readily refer to the PI-based-location table to determine the PI-based location for the sector in which the mobile station is operating. The MPC can then push the PI-based location to a location-services provider. Alternatively, an authorized location-services provider can pull PI-based location information from the table. Intermediate messaging entities (not shown) may be provided as well.

In addition, MPC 114 can be arranged to maintain a table 148 indicating the location of registered mobile stations, such as MS 108. Table 148 can list, for each mobile station, the mobile station's MIN (or an encrypted version of the MIN) and a corresponding LocationAreaID, which can be translated into a PI-based location by reference to table 146. Alternatively, table 148 can itself list the MIN (or encrypted MIN) and a corresponding PI-based location.

To populate table 148, HLR 122 or another suitable entity can be programmed to send a signaling message to MPC 114 via a link 150 whenever HLR 122 receives a REGNOT message providing a LocationAreaID for a mobile station. The signaling message can identify the MIN of the mobile station and the LocationAreaID. MPC 114, in turn, can be programmed to store the MIN (or establish and store an encrypted version of the MIN) and the corresponding LocationAreaID and/or PI-based location (per table 146) in table 148. Alternatively or additionally, each time MPC 114 receives an ORREQ message or other message that identities a mobile station's current LocationAreaID, the MPC can store the mobile station's MIN (or encrypted MIN) and LocationAreaID and/or PI-based location in table 148.

According to the exemplary embodiment, an authorized location-services platform, such as platform 138 or 144, can then signal to MPC 114 to determine where a particular mobile station is located, or to find out which mobile stations are located in a particular geographic area (such as in an area covering one or more sectors). MPC 114 can then query table 146 and/or table 148, and respond accordingly, so as to facilitate a location-based service.

C. Example: MPC pushes PI-based location to PSAP

As noted above, one example of a location-based-service provider is an emergency service center, which can use location to help locate a mobile emergency caller. Referring to FIG. 12, the process of using a PI-based location to help facilitate emergency services can operate as follows.

First, a user of a mobile station, such as MS 108, enters the digits "911" and presses "SEND", "TALK" or another designated key on the mobile station to cause those digits to pass via BTS 106 and BSC 104 to MSC 102. MSC 102 will then receive those dialed digits and begin to process the call. In particular, MSC will apply a set of call-processing program logic to analyze the dialed digits and to then physically (or logically) connect the call from MS 108 to the dialed destination, PSAP 130 (or more generally ESN 126).

In accordance with J-STD-036, the call-processing logic will include a trigger point at which the MSC will recognize that the digits dialed are "911" and that the MSC should pause call processing and signal up to MPC 114. MSC 102 will thus pause call processing and send an ORREQ message up to MPC 114, which will carry the mobile station's MIN and the LocationAreaID indicating the sector in which the MS is currently operating.

When MPC 114 receives the ORREQ, the MPC will read the LocationAreaID from the ORREQ and then query the PI-based-location table so as to determine the PI-based location that represents the sector in which the MS is operating.

Depending on the arrangement, MPC 114 may then send an "orreq" response message to MSC 102, providing MSC 102 with the PI-based location as an indication of where MS 108 is located. (In this regard, J-STD-036 defines a geographic position (GEOPOS) parameter in an orreq response message, which can be used to convey a latitude/longitude position; other parameters could be defined as well.) MSC 102 would then send a call-setup message (e.g., an ISUP Initial Address Message ("IAM")) to the emergency services network, which would carry as a parameter the PI-based location of MS 108 as returned by MPC 114. Thus, when PSAP 130 receives the call, PSAP 130 will already have the PI-based location as an indication of where the caller is located, thereby enabling emergency services personnel to better assist the caller.

Alternatively, the MPC can itself signal to the emergency services network (via an Emergency Services Message Entity (not shown)), providing PSAP 130 with the PI-based location as an indication of where MS 108 is located, together with a transaction identifier, such as the mobile station's MIN. And the MPC may further send an orreq response to MSC 102. MSC 102 would then connect the call to PSAP 130, and PSAP 130 would associate the location provided by MPC 114 with the call connected from MSC 108 (by reference to the transaction identifier, for instance), thereby establishing the location of the caller.

d. Example: MPC pushes PI-based location to ESP

In the exemplary embodiment, ESP 134 can also function as a location-based-service provider. For instance, ESP 134 could be programmed to provide a location-based directory service that provides a mobile caller with information about service establishments located near the caller. A process of facilitating such a service using PI-based location information may operate as follows.

First, a user of MS 108 dials a special feature code, such as "#76" for instance. When MSC 102 receives the feature code, it begins call processing and encounters a trigger point, which causes MSC 102 to send an ORREQ to MPC 114, conveying the MIN and LocationAreaID.

When MPC 114 receives the ORREQ, the MPC reads the LocationAreaID from the ORREQ and then queries the PI-based-location table so as to determine the PI-based location that represents the sector in which the MS is operating. The MPC then records the mobile station's MIN (or encrypted MIN) and PI-based location in table 148. Further, the MPC sends an orreq response message to MSC 102, instructing MSC 102 to route the call to ESP 134. MSC 102 will thus route the call via trunk 132 to ESP 134.

When ESP 134 receives the call, ESP 134 sends a signaling message to MPC 114 via a link 152, requesting the location of the caller. In an exemplary arrangement, link 152 can be an ISDN link or an Internet link or could take other forms. Further, the location request message could be an XML formatted request message. An MPC daemon (not shown) or other entity can receive the request message and forward it to the MPC.

Upon receipt of the location request message, the MPC queries table 148 and/or table 146 to determine the PI-based location of MS 108. The MPC then sends a response message to ESP 134, providing the PI-based location. ESP 134 then performs a directory service based on that location. For instance, the user of MS 108 may request an indication of nearby pizza restaurants, and ESP 134 may query a directory database to find pizza restaurants located within a 3 mile radius of the PI-based location.

e. Example: Location-Based Service Platform Pulls PI-Based Location Information from MPC Location-based-service platforms 138, 144 could also use PI-based location information to facilitate providing a location-based service. For example, MS 108 could engage in a data session via PDSN 140 and Internet 142 with platform 144. Alternatively, MS 108 could engage in a data session via link 136 with platform 138. Once connected, the platform can then ask MPC 114 for the location of MS 108, and MPC 114 can responsively provide the PI-based location.

For instance, upon initiation of the data session, the platform could have an encrypted MIN identifying MS 108. The platform can then send a location-request message to MPC 114 via a link 154 158, providing MPC 114 with the encrypted MIN. And MPC 114 can query table 146 and/or table 148 so as to translate the encrypted MIN into a PI-based location indicative of where MS 108 is located and then respond with a signaling message to platform 144, providing the PI-based location. Platform 144 can then perform a service for MS 108 based on that PI-based location.

As another example, a location-based-service platform such as platform 138 could query MPC to determine the MINs (or encrypted MINs) of some or all mobile stations that are currently located in a designated area. The area could be defined in any way, and the MPC could convert the area to geographic coordinates by reference to a mapping table. By reference to tables 146 and/or 148, the MPC can then determine which mobile stations are operating in a sector having a PI-based location in the designated area. And the MPC may then respond to platform 138, providing a list of MINs (or encrypted MINs) of some or all of those mobile stations. The platform can then perform a service with respect to all of those mobile stations.

For instance, platform 138 can be programmed to function as an e-coupon or electronic advertisement provider. The platform can thus query MPC 114 to find all mobile stations located in an area of commercial interest to a particular retailer, and the platform can then send coupons or advertisements, via link 136, to those mobile stations. Other examples are possible as well.

3. Conclusion

An exemplary embodiment of the present invention has been described above. Those skilled in the art will understand, however, that changes and modifications may be made to this embodiment without departing from the true scope and spirit of the present invention, which is defined by the claims. Further, it should be understood that the functions recited in the claims may occur in an order other that listed, unless noted otherwise.

We claim:

1. In a cellular wireless system having a plurality of sectors, wherein each sector of the plurality of sectors defines a respective geographic origin, a method of communicating a geographic location of a given sector, so as to facilitate a location-based service with respect to the given sector, the method comprising:

establishing a PI-based location to represent the given sector, wherein establishing the PI-based location to represent the given sector comprises geometrically establishing a polygon of influence for the origin of the given sector with respect to the origins of adjacent sectors, and wherein geometrically establishing the polygon of influence for the origin of the given sector with respect to the origins of adjacent sectors comprises (i) making a list of connecting lines that connect the origin of the given sector to origins of adjacent sectors, (ii) making a list of potential edge lines including perpendicular bisectors of each connecting line, (iii) clipping the potential edge lines where they intersect each other, and retaining as edge lines a piece of each clipped potential edge line closest to the origin of the given sector, and (iv) connecting the edge lines so as to form the polygon of influence; and communicating the PI-based location as a representation of the geographic location of the given sector, whereby the location-based service is performed based on the PI-based location.

2. The method of claim 1, wherein the location-based service comprises locating a mobile station positioned in the sector.

3. The method of claim 1, wherein the location-based service is selected from the group consisting of (i) emergency assistance, (ii) weather reporting, (iii) traffic reporting, (iv) mapping and (v) route planning.

4. The method of claim 1, wherein the PI-based location comprises the polygon of influence.

5. The method of claim 1, wherein the PI-based location comprises a geographic position within the polygon of influence.

6. The method of claim 1, wherein establishing the PI-based location to represent the given sector further comprises:

establishing as the PI-based location a representative point within the polygon of influence.

7. In a cellular wireless system having a plurality of sectors, wherein each sector of the plurality of sectors defines a respective geographic origin, a method of communicating a geographic location of a given sector, so as to facilitate a location-based service with respect to the given sector, the method comprising:

establishing a PI-based location to represent the given sector, wherein establishing the PI-based location to represent the given sector comprises (i) geometrically establishing a polygon of influence for the origin of the given sector with respect to the origins of adjacent sectors and (ii) establishing as the PI-based location a representative point within the polygon of influence, wherein establishing as the PI-based location a representative point within the polygon of influence comprises selecting a center point of a minimum bounding rectangle around the polygon of influence; and communicating the PI-based location as a representation of the geographic location of the given sector, whereby the location-based service is performed based on the PI-based location.

8. A method of communicating mobile station location in a cellular wireless system, the cellular wireless system having a plurality of sectors, wherein each sector of the plurality of sectors defines a respective geographic origin, the method comprising:
  determining that a mobile station is located in a given sector of the plurality of sectors;
  establishing a PI-based location to represent the given sector, wherein establishing the PI-based location to represent the given sector comprises geometrically establishing, as the PI-based location, a polygon of influence for the origin of the given sector with respect to the origins of adjacent sectors, and wherein establishing the polygon of influence for the origin of the given sector with respect to the origins of adjacent sectors comprises (i) making a list of connecting lines that connect the origin of the given sector to origins of adjacent sectors, (ii) making a list of potential edge lines including perpendicular bisectors of each connecting line, (iii) clipping the potential edge lines where they intersect each other, and retaining as edge lines a piece of each clipped potential edge line closest to the origin of the given sector, and (iv) connecting the edge lines so as to form the polygon of influence; and
  communicating the PI-based location as a representation of where the mobile station is located.

9. The method of claim 8, wherein the PI-based location comprises the polygon of influence.

10. The method of claim 8, wherein the PI-based location comprises a geographic position within the polygon of influence.

11. The method of claim 8, further comprising:
  maintaining data that correlates each sector of the plurality of sectors with a respective PI-based location,
  wherein, establishing the PI-based location to represent the given sector comprises using the data to identify a PI-based location for the given sector.

12. The method of claim 11, wherein the data comprises a database table in which each record indicates a PI-based location for a respective sector.

13. The method of claim 8, wherein establishing the PI-based location to represent the given sector comprises:
  establishing as the PI-based location a representative point within the polygon of influence.

14. The method of claim 8, wherein communicating the PI-based location as a representation of where the mobile station is located comprises:
  storing the PI-based location in a data store accessible to a recipient entity,
  whereby the recipient entity accesses the data store and obtains the PI-based location from the data store.

15. The method of claim 8, wherein communicating the PI-based location as a representation of where the mobile station is located comprises:
  transmitting the PI-based location to a location-based service provider in response to a request for a location of the mobile station.

16. The method of claim 15, wherein the location-based service provider comprises an emergency service entity.

17. The method of claim 8, wherein communicating the PI-based location as a representation of where the mobile station is located comprises:
  transmitting the PI-based location to a location-based service system when establishing a communication session between the mobile station and the location-based service system.

18. The method of claim 17, wherein the location-based service system comprises an emergency service entity.

19. The method of claim 17, wherein transmitting the PI-based location to a location-based service system when establishing a communication session between the mobile station and the location-based service system comprises:
  receiving a request to establish the communication session; and
  responsively transmitting the PI-based location to the location-based service system and processing a set-up of the communication session,
  whereby, upon establishment of the communication session, the location-based service system has the PI-based location.

20. The method of claim 17, wherein transmitting the PI-based location to a location-based service system when establishing a communication session between the mobile station and the location-based service system comprises:
  receiving a request to establish the communication session; and
  sending the PI-based location to the location-based service system in a session setup message,
  whereby, upon establishment of the communication session, the location-based service system has the PI-based location.

21. A method of communicating mobile station location in a cellular wireless system, the cellular wireless system having a plurality of sectors, wherein each sector of the plurality of sectors defines a respective geographic origin the method comprising:
  determining that a mobile station is located in a given sector of the plurality of sectors;
  establishing a PI-based location to represent the given sector, wherein establishing the PI-based location to represent the given sector comprises (a) geometrically establishing a polygon of influence for the origin of the given sector with respect to the origins of adjacent sectors and (b) establishing as the PI-based location a representative point within the polygon of influence, wherein geometrically establishing the polygon of influence for the origin of the given sector with respect to the origins of adjacent sectors comprises: (i) making a list of connecting lines that connect the origin of the given sector to origins of adjacent sectors, (ii) making a list of potential edge lines including perpendicular bisectors of each connecting line, (iii) clipping the potential edge lines where they intersect each other, and retaining as edge lines a piece of each clipped potential edge line closest to the origin of the given sector, and (iv) connecting the edge lines so as to form the polygon of influence; and
  communicating the PI-based location as a representation of where the mobile station is located.

22. A method of communicating mobile station location in a cellular wireless system, the cellular wireless system having a plurality of sectors, wherein each sector of the plurality of sectors defines a respective geographic origin, the method comprising:
  determining that a mobile station is located in a given sector of the plurality of sectors;
  establishing a PI-based location to represent the given sector, wherein establishing the PI-based location to represent the given sector comprises (i) geometrically establishing a polygon of influence for the origin of the given sector with respect to the origins of adjacent sectors and (ii) establishing as the PI-based location a representative point within the polygon of influence, wherein establishing a representative point within the polygon of influence comprises selecting a center point of a minimum bounding rectangle around the polygon of influence; and communicating the PI-based location as a representation of where the mobile station is located.

23. The method of claim 22, wherein establishing the PI-based location to represent the given sector comprises:
(a) establishing PI-based locations for all of the sectors;
(b) storing the PI-based locations in a data file; and
(c) using the data file to identify a PI-based location for the given sector.

24. The method of claim 23, further comprising repeating steps (a) and (b) periodically.

25. The method of claim 23, wherein establishing the polygon of influence for the origin of the given sector with respect to the origins of adjacent sectors comprises:
making a list of connecting lines that connect the origin of the given sector to origins of adjacent sectors;
making a list of potential edge lines including perpendicular bisectors of each connecting line;
clipping the potential edge lines where they intersect each other, and retaining as edge lines a piece of each clipped potential edge line closest to the origin of the given sector; and
connecting the edge lines so as to form the polygon of influence.

26. The method of claim 23, and wherein establishing PI-based locations for all of the sectors comprises, for each sector:
geometrically establishing polygon of influence for the origin of the sector with respect to the origins of adjacent sectors; and
establishing as a PI-based location for the sector a representative point within the polygon of influence.

27. The method of claim 26, wherein establishing the polygon of influence for the origin of the sector with respect to the origins of adjacent sectors comprises:
making a list of connecting lines that connect the origin of the given sector to origins of adjacent sectors;
making a list of potential edge lines including perpendicular bisectors of each connecting line;
clipping the potential edge lines where they intersect each other, and retaining as edge lines a piece of each clipped potential edge line closest to the origin of the sector; and
connecting the edge lines so as to form the polygon of influence.

28. The method of claim 26, wherein establishing a representative point within the polygon of influence comprises:
selecting a center point of a minimum bounding rectangle around the polygon of influence.

29. A system for communicating mobile station location in a cellular wireless system, the cellular wireless system having a plurality of sectors, wherein each sector of the plurality of sectors defines a respective geographic origin, the mobile station being located in a given sector of the plurality of sectors, the system comprising:
means for establishing a PI-based location to represent the given sector, wherein the means for establishing a PI-based location to represent the given sector comprises (a) a processor, (b) a data storage medium, and (c) machine language instructions stored in the data storage medium and executable by the processor to geometrically establish a polygon of influence for the origin of the given sector with respect to the origins of adjacent sectors, and wherein, to geometrically establish the polygon of influence for the origin of the given sector with respect to the origins of adjacent sectors, the processor performs functions comprising (i) making a list of connecting lines that connect the origin of the given sector to origins of adjacent sectors, (ii) making a list of potential edge lines including perpendicular bisectors of each connecting line, (iii) clipping the potential edge lines where they intersect each other, and retaining as edge lines a piece of each clipped potential edge line closest to the origin of the given sector, and (iv) connecting the edge lines so as to form the polygon of influence.

30. The system of claim 29, wherein the PI-based location comprises the polygon of influence.

31. The system of claim 29, wherein the functions further comprise:
establishing as the PI-based location a representative point within the polygon of influence.

32. The system of claim 31, wherein establishing a representative point within the polygon of influence comprises:
selecting a center point of a minimum bounding rectangle around the polygon of influence.

33. The system of claim 29, wherein the means for communicating the PI-based location as a representation of where the mobile station is located comprises:
machine language instructions stored in the data storage medium and executable by the processor to transmit the PI-based location to a recipient entity.

* * * * *

UNITED STATES PATENT AND TRADEMARK OFFICE
CERTIFICATE OF CORRECTION

PATENT NO. : 7,072,666 B1  
APPLICATION NO. : 09/886637  
DATED : July 4, 2006  
INVENTOR(S) : John Kullman, Jared A. Bohndorf and Rick Haught Page 1 of 1

It is certified that error appears in the above-identified patent and that said Letters Patent is hereby corrected as shown below:

On the title page, at [73], please delete Assignee "Spring Spectrum L.P." and add Assignee -- Sprint Spectrum L.P. --.

Signed and Sealed this
Twenty-first Day of May, 2013

Teresa Stanek Rea
*Acting Director of the United States Patent and Trademark Office*